July 22, 1969     S. G. LLOYD     3,456,669
PIEZOELECTRIC TRANSDUCER
Filed Oct. 20, 1966
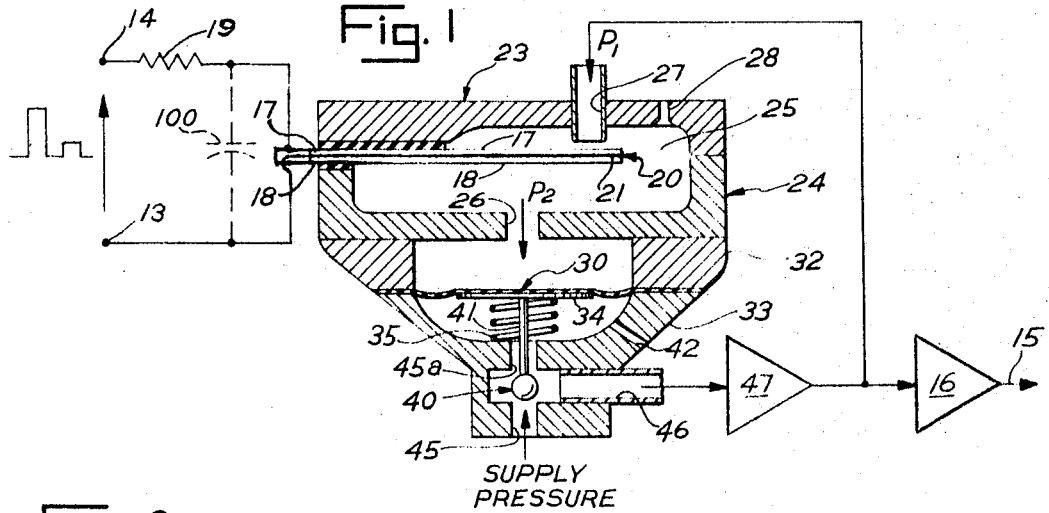
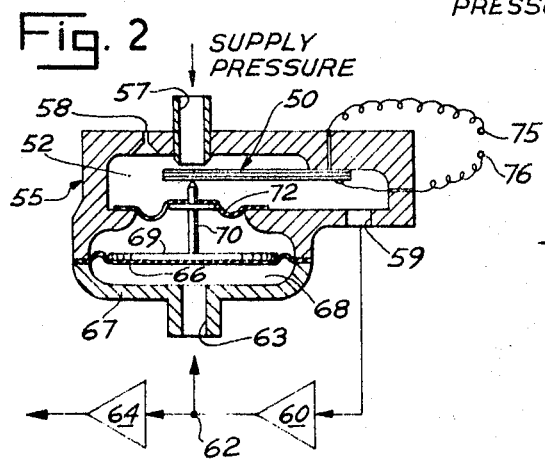
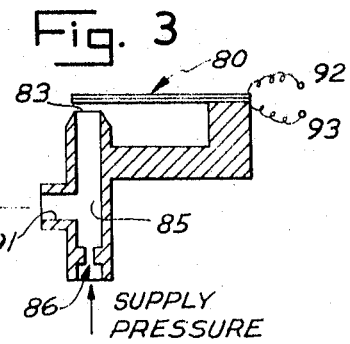
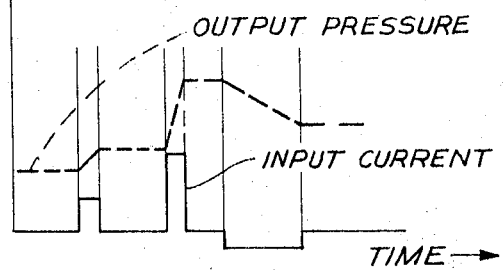
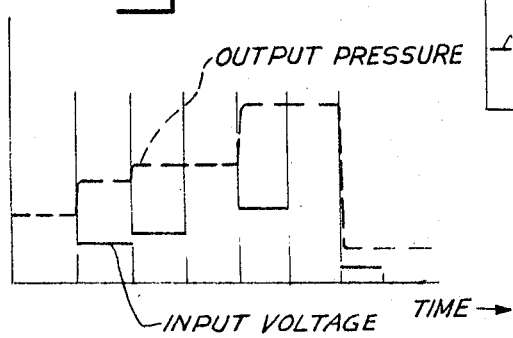
INVENTOR.
SHELDON G. LLOYD
BY Bair, Freeman & Molinare
ATTORNEYS

United States Patent Office 3,456,669
Patented July 22, 1969

3,456,669
PIEZOELECTRIC TRANSDUCER
Sheldon G. Lloyd, Marshalltown, Iowa, assignor to Fisher Governor Company, a corporation of Iowa
Filed Oct. 20, 1966, Ser. No. 588,057
Int. Cl. F15b 5/00; G05d 16/20
U.S. Cl. 137—84                                   6 Claims

ABSTRACT OF THE DISCLOSURE

A piezoelectric transducer has a housing defining a fluid-holding chamber with a piezoelectric flapper therein. Feedback means are provided for applying an external force against the flapper which is related to the magnitude of pressure within the chamber and which acts in opposition to the piezoelectric deflection force.

---

This invention relates to pressure control systems and, more particularly, to apparatus for translating electrical signal variations into fluid pressure variations.

The ability to accurately control fluid pressures by means of electrical signals is desirable in a variety of systems. Typical among these are control systems for refineries, pipeline facilities, and chemical plants, and hydraulic control systems for a variety of applications. To serve this need, valve devices employing electrically operated solenoids, motors, and the like, have been devised. While these arrangements are often highly effective for their intended purpose, their bulk, cost and complexity, together with their inability to provide highly accurate fluid pressure control, has limited the extent to which electrical control of fluid pressure has been employed. The recent advent of electronic computer control techniques has, however, increased the need for simple, yet accurate, electrical signal-to-fluid pressure transducers.

A general object of the present invention is to accurately translate an electrical signal into a related fluid pressure level.

A further obejct of the present invention is to provide an electrical signal-to-fluid pressure transducer which may be readily adapted to control fluid pressure levels in response to a discontinuous, pulse-type input signal of the type commonly appearing at the output of a computer or a time-shared master control signal generator.

The piezoelectric effect may be employed to advantage in a valve mechanism for controlling pressure levels in response to electrical signal variations. When a suitably oriented piezoelectric crystal is subjected to an electric field, the crystal deforms. A plurality of such electric crystal plates may be stacked in layers to form an electro-mechanical transducer capable of deflection in either direction as voltages are applied across the crystals. By suspending such a laminated structure in cantilver fashion adjacent a fluid port, an electrically controlled valve may be produced.

Although the internal deflection force created within the laminated structure as a result of the applied voltage is very nearly proportional to the magnitude of the applied voltage, the actual deflection is only crudely related to the magnitude of the electrical input signal. This results from the fact that the laminated transducer possesses very poor spring characteristics. As a result, the relationship between the applied electrical signal and the output pressure level generally exhibits severe errors due to nonlinearity and hysteresis effects.

It is accordingly a more specific object of the present invention to provide a piezoelectric electrical-to-pressure level transducer having excellent linearity.

Yet a further object of the present invention is to accurately and rapidly control a fluid pressure level in response to fluctuations in the magnitude of an input electrical signal.

In a principal aspect the present invention takes the form of an arrangement for translating an electrical input signal into a related fluid pressure level output. According to a feature of the invention, a fluid-holding chamber having an inlet port and an outlet port is employed with a source of fluid pressure being connected to the inlet port for pressurizing the chamber. According to a further feature of the invention, an electrically operated piezoelectric transducer is positioned adjacent at least one of these ports for controlling the pressure in the chamber. Means are employed for applying an electrical input signal to the piezoelectric transducer to create a deflection force within the transducer tending to move it in a first direction to alter the pressure level within the chamber. According to a further feature of the invention, feedback means are employed for applying an external force against the transducer which is related to the magnitude of pressure within the chamber, this external force acting in opposition to the internal, electrically induced deflection force. Means are then employed for sensing the pressure level within the chamber to produce the fluid pressure level output.

The present invention is capable of controlling the output pressure level in response to input signal variation with a high degree of accuracy and may be adapted to accept a discontinuous, coded pulse input signal from a computer or the like. The transducer, according to the invention, may be adapted to exhibit "memory" so that its output pressure level will be maintained at a proper value for a period of time between separate electrical input signals. In this manner, the novel transducer according to the invention is capable of accepting and storing information contained in the input signal so that the controlling signal generator may be time-shared with other electrical-to-pressure transducers.

These and other objects, features, and advantages of the present invention will be made most manifest and particularly pointed out in clear, concise and exact terms in conjunction with the accompanying drawing wherein:

FIGURE 1 is a schematicized, cross-sectional view of a transducer arrangement embodying the invention and capable of translating an electrical input signal into a fluid pressure level output;

FIGURE 2 is a schematicized, cross-sectional view of a second embodiment of the invention;

FIGURE 3 is a schematicized, cross-sectional view of a third embodiment of the invention;

FIGURE 4 is a graph illustrating the manner in which discontinuous input voltage may be employed to control the output pressure level produced by transducers embodying the invention; and FIGURE 5 is a graph illustrating the manner in which the transducers employing the principles of the invention may be used to provide an output pressure level which is proportional to the integral of a sequence of input current pulses.

The arrangement shown in FIGURE 1 of the drawing translates an electrical signal applied to terminals 13 and 14 into a related fluid pressure which appears at the output 15 of a fluid pressure amplifier 16. When an electrical signal is applied across terminals 13 and 14, a voltage is created across piezoelectric crystal plates 17 and 18 of a flapper assembly indicated generally at 20. The faces of plates 17 and 18 are coated with a conductive film forming the electrodes for the flapper 20. The terminal 13 is connected directly to film layer 21 which separates plates 17 and 18 while terminal 14 is connected through a resistor 19 to the films on the outer faces of both plates 17 and 18. The flapper assembly 20 is itself clamped to one of the casing members indicated generally at 23 or 24 which define an interior chamber 25. Suitable precaution is taken to electrically insulate layers 17 and 18 from the casing. The chamber 25 is provided with a pressure input port at 27 and an outlet bleed orifice 28 which takes the form of a passageway through casing element 23. The pressure within chamber 25 is communicated through an opening 26 in the base of casing element 24 to the upper face of an expansible element or diaphragm indicated generally at 30. The diaphragm 30 is clamped around its marginal edges between housing members 32 and 33. The underside of diaphragm 30 is operatively engaged by a spring loaded piston element 34 which is urged upwardly by the helical spring 35. A ball valve 40 is affixed to the piston element 34 by means of a valve stem 41 and cooperates with its seat to control the flow of supply pressure entering housing portion 33. The chamber below diaphragm 30 is vented to atmosphere by means of the port 42.

Pressure increase within the chamber 25 causes the diaphragm 30 and hence the ball valve 40 to be urged downwardly against the upward force of spring 35. The ball valve 40, as it is forced downward, approaches a seat formed at the upper edge of a supply pressure inlet port 45 and away from exhaust port 45A. Thus, fluid flow through the ports 45 and 45A is varied in response to an increase in pressure within the control chamber 25 and hence the fluid pressure at outlet port 46 is reduced.

The pressure within chamber 25 is determined solely by the input pressure level at input port 27 and the relative sizes of the passageway presented by bleed orifice 28 and the flow area between flapper 20 and the outlet end of the nozzle defining port 27. As the flapper 20 deflects away from the port 27 in response to the application of a voltage of appropriate polarity across layers 17 and 18, the pressure within the chamber 25 tends to increase. The pressure increase is applied to the top of diaphragm 30, moving the center portion of the diaphragm downwardly and causing the piston 34 and the ball valve 40 to be forced downwardly, restricting the inlet port 45 and decreasing the control pressure appearing at the outlet port 46. This pressure decrease may be amplified by optional fluid pressure amplifiers 47 of a suitable design. The pressure level existing at the output of 46 or optional amplifier 47 is applied to the input port 27. Thus, the varying nozzle pressure at inlet port 27 constitutes a feedback around flapper 20, the ball valve 40 and its associated mechanism, and any additional amplifiers 47.

The pressure level at inlet port 27 may be designated $P_1$ and the pressure within chamber 25 termed $P_2$. A downward force F is applied to the flapper 20 which is equal to the product of the effective nozzle area A of inlet port 27 and the pressure differential $(P_1-P_2)$, that is:

$$F=(P_1-P_2)A$$

Because of the negative pressure gain, $-G$, provided by the combination of the ball valve mechanism operated by piston 30 and any optional fluid amplifiers 47, a small change $\Delta P_2$ in the pressure within chamber 25 results in a much larger change $\Delta P_1$ in the pressure at inlet port 27. Thus, as the piezoelectric deflection force tends to force the flapper 20 downward, this electrically induced force is balanced by a reduction, $\Delta F$, in the downward force caused by the pressure difference existing between nozzle 27 and chamber 25. This decrease may be statically expressed as follows:

$$\Delta F=(\Delta P_1-\Delta P_2)A$$

Moreover since $\Delta P_1=-G\Delta P_2$, the equation above may be written:

$$\Delta F=-A(G+1)\Delta P_2$$

Accordingly, a small change, $\Delta P_2$ in the pressure within chamber 25 causes a marked decrease, $\Delta F$, in the externally applied downward pressure against flapper 20. If the gain G is made sufficiently large, the application of a voltage to flapper 20 will cause very little change in the pressure $P_2$ in chamber 25 and the flapper 20 will exhibit negligible deflection, even though the pressure level $P_1$ exhibits a marked change. Thus, the feedback arrangement shown in FIGURE 1 balances the electrically induced force in the piezoelectric flapper 20 against an externally applied feedback force which is almost entirely due to $\Delta P_1$. As a result, the inaccuracies which would otherwise exist because of the poor spring characteristics of the flapper 20 are compensated for and effectively canceled by the much larger, electrically induced force and the counteracting externally applied feedback force.

It should be noted that neither the amount of negative gain, $-G$, nor the initial placement of the flapper 20 are critical. So long as sufficient gain is employed, the position of equilibrium with respect to the nozzle presented by inlet port 27 and will thereafter be deflected only by a negligible amount.

The feedback force against the piezoelectric flapper may be applied in a mechanical fashion as indicated by the embodiment of the invention shown in FIGURE 2. In that arrangement, a piezoelectric flapper indicated generally at 50 is mounted cantilever fashion within a chamber 52 defined by the interior of the housing indicated generally at 55. The chamber 52 is pressurized through an inlet port 57 which is connected to a source of supply pressure. A bleed orifice 58 is provided through housing 55 for communicating chamber 52 to the ambient. An outlet opening 59 is also provided through the housing 55 and may be directly connected to the input of optional fluid pressure amplifier 60. The opening 59 functions to communicate the pressure within the chamber 52 to the input of the optional fluid pressure amplifier 60. Either the amplified pressure level existing at the output 62 of the fluid pressure amplifier 60 or the output of 59 directly is applied to fluid pressure amplifier 64 and is applied through port 63 to the underside of a diaphragm 66, the marginal edges of which are clamped or otherwise secured between housing 55 and casing member 67 which defines a chamber 68 below diaphragm 66. As the diaphragm 66 is forced upward, it urges a piston 69 and a push rod 70 upwardly. The push rod 70 passes through a second, smaller diaphragm 72 which forms a portion of the surface bounding chamber 52.

As before, an electrical input signal applied to terminals 75 and 76 causes an internal, electrically induced deflection force to be created within the flapper 50. When the flapper 50 tends to deflect away from the inlet port 57, the pressure within chamber 52 is increased. This increase may be amplified by one or more optional fluid pressure amplifiers 60 and applied to the underside of diaphragm 66 or feedback directly to the diaphragm, forcing the push rod against the flapper 50 and tending to counteract the original deflection. As discussed in conjunction with the embodiment shown in FIGURE 1, the externally applied feedback force directed against the flapper 50 prevents substantial excursion of the flapper when subjected to an electrical driving signal. As before, the undesirable effects of the imperfect spring characteristics of the flapper 50 are accordingly minimized.

As illustrated by the embodiment of the invention shown in FIGURE 3, the novel feedback effect contemplated by the invention may be achieved without requiring the use of intermediate fluid amplifiers. The arrangement shown in FIGURE 3 is essentially a relief valve mechanism wherein the piezoelectric flapper 80 is positioned adjacent an outlet port 83 which is in communication with a controlled pressure chamber 85. The chamber 85 is pressurized through a restricted inlet orifice indicated at 86. The level of pressure within chamber 85 is sensed by an output fluid amplifier 90 connected to a sensing port 91. Normally, the greater than ambient pressure within chamber 85 tends to force the flapper 80 upwardly. When an electrical signal is applied to the input terminals 92 and 93, connected to the flapper 80, the flapper tends to deflect toward or away from the outlet port 83 (depending upon the polarity of the applied voltage). Should the electrically induced deformation of the crystals within flapper 80 tend to force the end of flapper 80 toward the outlet port 83, the pressure within the chamber 85 increases. Accordingly, the upward pressure exerted due to the pressure difference between chamber 85 and the exterior pressure increases the upward force against flapper 80, tending to counteract the electrically induced force. Thus, as in the embodiments shown in FIGURES 1 and 2 of the drawings, the arrangement shown in FIGURE 3 includes inherent feedback for applying an external force against the flapper which is related to the magnitude of pressure wiithin the chamber 85, this externally applied force acting in opposition to the electrically induced force.

The magnitude of the electrically induced force present within each of the embodiments shown in FIGURES 1–3 is directly proportional to the voltage applied across the plates of the piezoelectric flapper. The flapper in each of these embodiments, being comprised of at least a pair of piezoelectric layers, behaves electrically in the steady state as a simple capacitance. This effective capacitance is illustrated by the capacitor 100 shown in phantom in FIGURE 1. Accordingly, if the flapper is driven by a discontinuous, switched voltage source, the stored charge across the piezoelectric crystalline material tends to hold the flapper in position even after the applied voltage is removed by opening the switch. Thus, as illustrated in the graph of FIGURE 4, voltage pulses from a discontinuous source may be employed to operate the transducer contemplated by the invention such that the transducer possesses an effective "memory"; that is, once a pressure level is established, it remains even after the driving voltage terminates. The electrical pulse waveform shown in FIGURE 4 accordingly produces an output pressure level waveform indicated by the dash line. The actual voltage waveform across the flapper plate is, of course, proportioned to the pressure level at all times.

Because the flapper behaves as an electrical capacitance, the transducer may also be driven by current pulses such that the output pressure waveform is proportional to the integral of the applied current waveform as indicated in FIGURE 5. Whatever current flows into the transducer, the charge stored across the flapper plate is gradually increased, causing a consequent increase in the output pressure. Negative-going current pulses decrease the stored charge and accordingly, also decrease in the output pressure level. Both of these effects are illustrated by FIGURE 5 of the drawings.

While presently preferred embodiments of the invention have been described, it will be understood that the invention is not limited thereto since it may be otherwise embodied.

What is claimed is:
1. An arrangement for translating an electrical input signal into a related fluid pressure level output which comprises, in combination,
  a chamber having an inlet port and an outlet port,
  a source of fluid pressure connected to said inlet port for pressurizing said chamber,
  an electrically operated piezoelectric flapper positioned adjacent the inlet port for controlling the pressure in said chamber,
  means for applying said electrical input signal to said flapper to create a piezoelectric deflection force tending to move said flapper to alter the pressure within said chamber,
  feedback means for applying an external force against said flapper which is related to the magnitude of pressure within said chamber, said force acting in opposition to said piezoelectric deflection force, and
  said feedback means including sensing means connected to said chamber for producing said fluid pressure level output in accordance with the magnitude of the pressure within said chamber.

2. An arrangement as set forth in claim 1 wherein said flapper comprises at least one piezoelectric crystal and means for subjecting said crystal to an electric field in response to said electrical input signal.

3. An arrangement as set forth in claim 1 wherein said feedback means includes means for sensing changes in the magnitude of pressure within said chamber, means responsive to said changes for producing a control pressure, and means responsive to said control pressure for varying the magnitude of said external force.

4. An arrangement for translating an electrical input signal into a related fluid pressure level output which comprises, in combination,
  a chamber having an inlet port and outlet port,
  a source of fluid pressure connected to said inlet port for pressurizing said chamber,
  an electrically operated piezoelectric flapper positioned adjacent at least one of said ports for controlling the pressure in said chamber,
  means for applying said electrical input signal to said flapper to create a piezoelectric deflection force tending to move said flapper to alter the pressure within said chamber,
  feedback means for applying an external force against said flapper which is related to the magnitude of pressure within said chamber, said force acting in opposition to said piezoelectric deflection force, and
  said feedback means including sensing means connected to said chamber for producing said fluid pressure level output, said sensing means including means for sensing changes in the magnitude of pressure within said chamber, means responsive to said changes for producing a control pressure, and means responsive to said control pressure for varying the magnitude of said external force, said flapper being positioned adjacent said inlet port and wherein said means responsive to said control pressure comprises means for varying the pressure at said inlet port.

5. An arrangement as set forth in claim 3 wherein said means responsive to said control pressure comprise an expansible element, means for applying said control pressure against one side of said expansible element, and means coupled to said expansible element for applying said feedback force against said flapper.

6. An arrangement for translating an electrical input signal into a related fluid pressure level output which comprises, in combination,
  a housing defining a chamber having inlet and outlet port means therein,
  means communicating a source of fluid pressure to said chamber for pressurizing said chamber,
  an electrically-operated piezoelectric flapper positioned adjacent said inlet port means for controlling the pressure in said chamber, means for applying said electrical input signal to said flapper to create a piezoelectric deflection force tending to move said flapper to alter the pressure within said chamber, feedback means for applying an external force against said flapper which is related to the magnitude of pressure within said chamber and which acts in opposition to said piezoelectric deflection force, said feedback means having sufficient gain to substantially limit movement of said flapper, and said feedback means including sensing means communicating with said chamber for producing said fluid pressure level output.

References Cited

UNITED STATES PATENTS

| | | | |
|---|---|---|---|
| 2,800,914 | 7/1957 | Side | 137—85 |
| 2,952,266 | 9/1960 | Behens et al. | 137—85 |
| 3,063,422 | 11/1962 | Gregowski et al. | 137—82 XR |
| 3,174,499 | 3/1965 | Mott | 137—82 |

LOUIS R. PRINCE, Primary Examiner

DONALD O. WOODIEL, Assistant Examiner

U.S. Cl. X.R.

73—388; 137—85